H. A. SCHNITTKER.
RESILIENT WHEEL.
APPLICATION FILED FEB. 20, 1919.
1,397,907.
Patented Nov. 22, 1921.
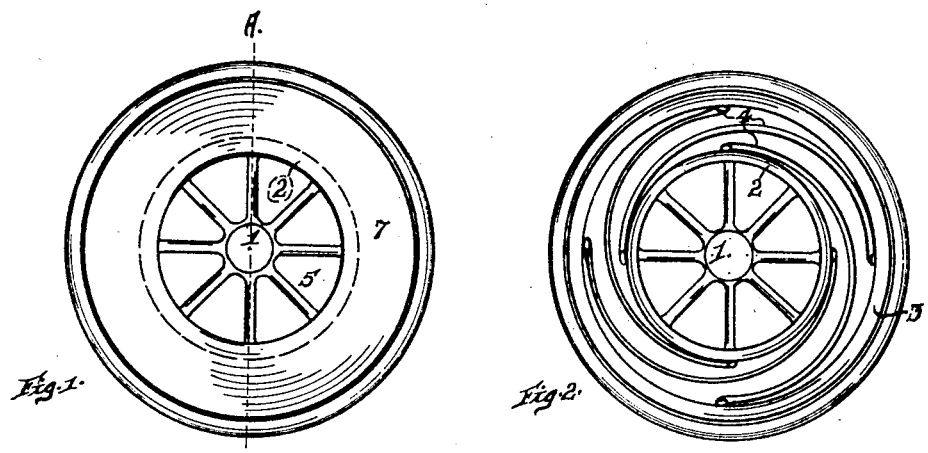
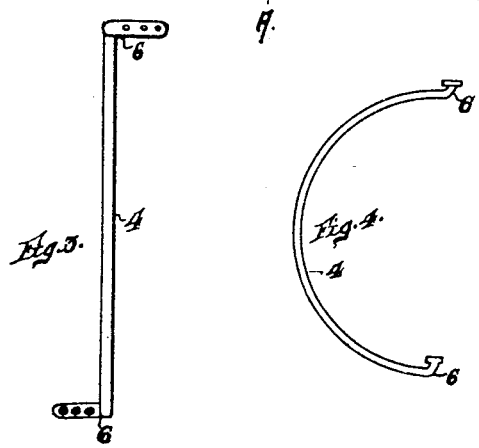
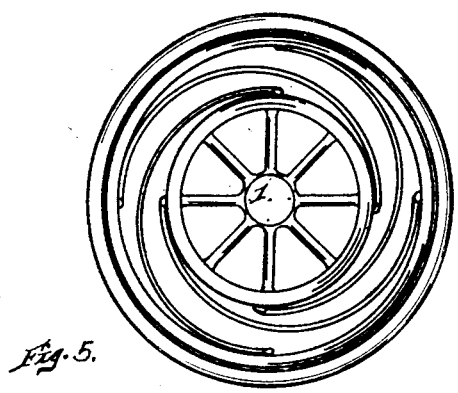
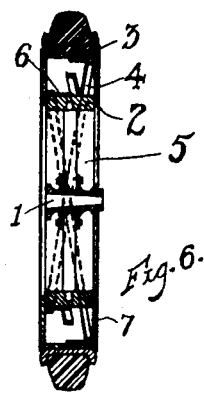
INVENTOR
H. A. Schnittker.
BY Adam E Fisher
ATTORNEY

UNITED STATES PATENT OFFICE.

HENRY A. SCHNITTKER, OF ST. LOUIS, MISSOURI.

RESILIENT WHEEL.

1,397,907.   Specification of Letters Patent.   Patented Nov. 22, 1921.

Application filed February 20, 1919. Serial No. 278,242.

*To all whom it may concern:*

Be it known that I, HENRY A. SCHNITTKER, a citizen of the United States, residing in the city of St. Louis, State of Missouri, have invented new and useful Improvements in Resilient Wheels, of which the following is a specification, reference being had to the accompanying drawings.

This invention pertains to resilient wheels of the type wherein the strains and stresses are spread and distributed through the entire wheel structure, by means of a system of semi-circular springs or spring links connecting an inner rim and an outer rim, said inner rim being connected in turn with the hub of the wheel in any ordinary manner. The main purpose of the invention therefore is to provide a wheel of this character which may be built in a simple manner and of relatively few parts, and which will be practicable in actual use and operation. My invention consists therefore, primarily of a system of curved springs, each spring being substantially more or less semi-circular in form and being made preferably of flat spring steel or similar material, and sprung into form and place as connecting links between the inner and outer rims of the wheel thus completing the resilient wheel as a whole.

In working out the invention it might be possible to dispense with the inner rim and extend the spring links immediately between the hub and outer rim and this modification is shown in one of the drawings, but it is thought this construction would afford too great side flexibility and the preferred construction is as above outlined, that is to say, extending the spring links between the inner rim and the outer rim.

Figure 1 of the drawings is a side elevation of such a wheel;

Fig. 2 is a side elevation of such a wheel with the side cover removed.

Fig. 3, a sample spring link shown in its flat form, before being sprung into place in the wheel;

Fig. 4, a sample spring link shown in its curved form after being sprung into place in the wheel.

Fig. 5, is a modification showing a reversed arrangement of the spring links around the wheel.

Fig. 6 is a diametrical cross section of a modification showing a method of staggering the spring loops between the inner rim and the outer rim for the purpose of giving greater strength against side stresses.

In carrying out my invention in its preferred construction, I provide the usual hub 1, an inner rim 2, and an outer rim 3 and join the inner rim and outer rim together by means of a plurality of curved spring connecting links 4. These links 4 extend substantially in the form of semi-circles from the inner rim to the outer rim around the wheel, said wheel being represented as a whole by the numeral 5. The inner end of each curved spring connecting link 4 is rigidly attached to the inner rim 2, while the outer end of each said curved connecting link is likewise rigidly attached to the outer rim 3. The ends of the links 4 at their points of juncture with the inner and outer rims may be staggered for the sake of greater resistance against side stresses, that is to say, the inner ends may be staggered from side to side around the inner rim 2 and the outer ends may be likewise staggered from side to side around the outer rim 3, and so that in respect of adjacent links the junctures with the inner and outer rims will be upon opposite sides of said rims, as shown in Fig. 6. By this construction and arrangement of the links all side stresses will be fully taken care of. In order to give the wheel 5 greater diametrical strength and power of resistance against radial stresses, the spring links 4 may be taken in their flat form as shown in Fig. 3 and then forcibly sprung into place in the wheel as shown in Fig. 4, they thus assuming their curved or semi-circular form in the wheel; thus the centrifugal thrust of the spring links 4 will be considerable, and so as to afford a very stiff resiliency to the wheel as a whole. It will be noted in the preferred construction that the bends 6 of the spring links 4 are all turned in the same direction in their arrangement around the wheel; although the direction of the bends 6 might be reversed as shown in Fig. 5. Any suitable side coverings, as 7, may be provided and extended around the sides of the rims 2 and 3 so as to inclose the intervening space between said rims. These side coverings 7 are permanently attached to the outer rim 3 and slidingly impinge against the sides of the inner rim 2. Thus the inner rim would have free motion between said side coverings under the play of the spring links 4. These side coverings 7 would serve to exclude dust and dirt from entering between rims 2 and 3.

While the spring links 4 are herein described as substantially semi-circular, it is understood that they may be either greater or less than complete semi-circles, when sprung into the wheel, as may best serve the purpose in actual construction.

While I have herein described a specific form of construction of my invention, it is understood said construction may be varied in matters not departing from the spirit of my invention as defined in the appended claims.

I claim to be new and patentable:

1. A resilient wheel comprising a hub, an inner rim, an outer rim spaced from the inner rim, and a plurality of normally straight springs of a length to extend substantially half way around the wheel and flexed into a substantially semi-circular form to place the said springs under tension to arrange their terminals at approximately diametrically opposite points in the wheel, the terminals of each spring being bent in opposite directions at right angles to form integral attaching arms, said springs being arranged within the space between the inner and outer rims and alternately secured at their inner ends to the inner rim adjacent to one of the side edges of the said inner rim and at their outer ends to the inner face of the outer rim at the opposite side edge thereof.

2. A resilient wheel comprising a hub, an inner rim, an outer rim spaced from the inner rim, the space between the rims being less than the distance between the inner rim and the axis of the latter, and a plurality of normally straight springs of a length to extend substantially half way around a wheel and flexed into substantially semi-circular form to place the said springs under tension to arrange their terminals at approximately diametrically opposite points in the wheel, said springs being arranged within the aforesaid space between the inner and outer rims and alternately secured at their inner ends to the inner rim adjacent to one of the side edges of said inner rim and at their outer ends to the inner face of the outer rim at the opposite side edges thereof, all of the springs having spaced overlapping relation with respect to one another.

HENRY A. SCHNITTKER.

Witnesses:
A. K. DOHLE,
A. M. DOWD.